United States Patent
Guo et al.

(10) Patent No.: US 8,509,364 B2
(45) Date of Patent: Aug. 13, 2013

(54) PLATFORM NOISE ESTIMATION AND MITIGATION FOR WIRELESS RECEIVERS

(75) Inventors: Yongfang Guo, Sunnyvale, CA (US); Xintian Eddie Lin, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 319 days.

(21) Appl. No.: 12/886,316

(22) Filed: Sep. 20, 2010

(65) Prior Publication Data

US 2012/0069940 A1    Mar. 22, 2012

(51) Int. Cl.
   *H03D 1/04*    (2006.01)
(52) U.S. Cl.
   USPC .......................................... 375/346; 375/316
(58) Field of Classification Search
   USPC ................................................. 375/346, 316
   See application file for complete search history.

(56) References Cited

U.S. PATENT DOCUMENTS

| | | | |
|---|---|---|---|
| 7,653,160 B2 | 1/2010 | Piirainen | |
| 2005/0101279 A1* | 5/2005 | Lee et al. | 455/278.1 |
| 2005/0282500 A1* | 12/2005 | Wang et al. | 455/67.13 |
| 2006/0211389 A1 | 9/2006 | Lin et al. | |
| 2010/0027590 A1* | 2/2010 | Alebachew et al. | 375/148 |

OTHER PUBLICATIONS

Hutter, A.A., and Hasholzner, R., "Determination of Intercarrier Interference Covariance Matrices and their Application to Advance Equalization for Mobile OFDM", 2000, pp. 33-1 to 33-5, 5th International OFDM-Workshop, Hamburg, Germany.

Bottomley, Gregory E. et al., "A Generalized RAKE Receiver for Interference Suppression", Aug. 2000, pp. 1536-1545, IEEE Journal on Selected Areas in Communication, vol. 18, No. 8.

Bottomley, Gregory E. et al., "Advance receivers for WCDMA terminal platforms and base stations", 2006, pp. 54-58, Ericsson Review No. 2.

Fulghum, Tracy L. et al., "Adaptive Generalized Rake Reception in DS-CDMA Systems", 2009, pp. 1-11, IEEE Transactions on Wireless Communications.

* cited by examiner

*Primary Examiner* — Zewdu Kassa
(74) *Attorney, Agent, or Firm* — Schwabe, Williamson & Wyatt, P.C.

(57) ABSTRACT

An apparatus and method suitable to estimate impairments of wireless signals, including both noise and interference of the wireless signals are disclosed herein. The noise of the wireless signals may be caused by thermal noise and platform noise. An adaptive scheme may dynamically switch between estimating interference only or the combined noise and interference. Other embodiments may be disclosed or claimed.

20 Claims, 9 Drawing Sheets

PLATFORM NOISE ESTIMATION AND MITIGATION FOR WIRELESS RECEIVERS

TECHNICAL FIELD

The present disclosure generally relates to wireless communications, in particular, estimating impairments of received wireless signals, including both impairments caused by noise and impairments caused by interference.

BACKGROUND

As wireless communication becomes more and more popular, demand for high speed wireless communication has dramatically increased. Standards such as Universal Mobile Telecommunications System (UMTS) and High Speed Packet Access (HSPA) have been developed to meet this demand.

Signal quality of the receiver radio, or the receiver, in the subscriber station or the base station may have significant impact on the performance of the wireless communication. Wireless signals, as received by the antenna and passed through to the receiver, may contain various impairments, including noise and/or interference. Noise may include platform noises generated by the hardware platform, such as clocks and data buses of the subscriber station or the base station. Interference may result from other symbols of interest (inter-symbol interference), symbols intended for other users in the cell (intra-cell interference), or symbols intended for other users in other cells (inter-cell interference).

Certain communication systems may estimate noise based on an additive white Gaussian noise (AWGN) model, in which case the noise may be treated as a linear addition of wideband or white noise with a constant spectral density (often measured as watts per hertz of bandwidth) and a Gaussian distribution of amplitude. However, AWGN based noise model may be inadequate for communication systems in which noises caused by the hardware platform are significant.

Interference may be modeled based on the orthogonal nature of the wireless signals received by the receiver. For example, a generalized rake (G-Rake) receiver may be able to reduce the effect of interference on a received wireless signal by estimating interference and compensating for its impact. A G-Rake receiver may also estimate the noise of the received wireless signal based on the AWGN model. However, platform noises, which may include non-AWGN based noises, are neither modulated based on orthogonal codes nor based on a Gaussian distribution. As such, the current method of estimating interference and AWGN in traditional G-Rake receivers may not provide adequate compensation when the impairments caused by the platform noises are significant.

Platform noise may degrade receiver performance and make the equipment more difficult to pass carriers' certification test. As subscriber stations and base stations become more and more complex, the impact of platform noise to the receiver may become more and more significant.

BRIEF DESCRIPTION OF THE DRAWINGS

Embodiments of the present disclosure will be described by way of exemplary illustrations, but not limitations, shown in the accompanying drawings in which like references denote similar elements, and in which.

DETAILED DESCRIPTION OF ILLUSTRATIVE EMBODIMENTS

Figure 1:
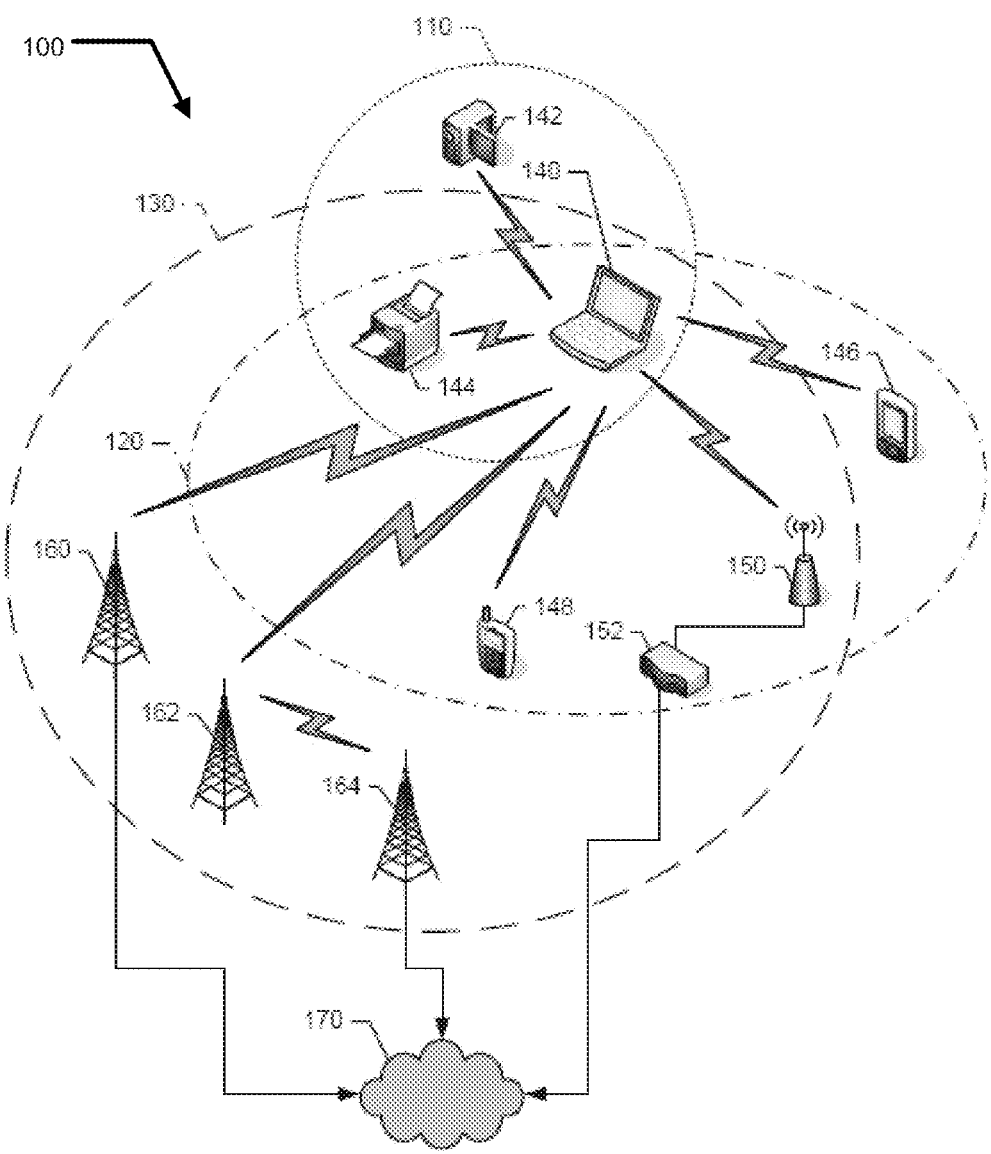
FIG. 1 illustrates an example wireless communication system in accordance with various embodiments.

In the following detailed description, reference is made to the accompanying drawings which form a part hereof, and in which are shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

A rake receiver is a multipath receiver that collects signal energy from different delayed versions of a transmitted signal. A rake receiver may include multiple sub-receivers, also known as "fingers." The fingers of the rake receiver may extract signal energy from delayed signal images by despreading and combining them coherently by using complex conjugates of estimated channel coefficients to estimate the modulation symbol.

A generalized rake (G-Rake) receiver is a rake receiver that in addition to estimating the modulation symbol, may also estimate interference and AWGN of the received signal and compensate for its effect. Interference, including inter-symbol interference, inter-cell interference and intra-cell interference, may be modeled based on orthogonal nature of the received wireless signals, such as one that is based on a parametric estimation scheme illustrated in Equation (1):

$$R_u = E_c R(g) + N_0 R_1 \quad (1),$$

wherein $R_u$ is the interference covariance matrix, $E_c$ is the transmit power from the desired base station, $N_0$ is the power of AWGN of the received signal, $R_1$ is the identity matrix for $N_0$, and $R(g)$ is the normalized interference covariance matrix. Furthermore, each element in the normalized interference covariance matrix $R(g)$, i.e., each cell of the interference covariance matrix, corresponding to row d1 and column d2, may be represented by Equation (2):

$$r(d1, d2) = \sum_{l1=0}^{L-1} \sum_{l2=0}^{L-1} g(l1)g(l2) \sum_{m=-\infty}^{+\infty} (1 - \delta(m))R_p(d1 - mT_c - \tau(l1))R_p(d2 - mT_c - \tau(l2)), \quad (2)$$

wherein g is the channel impulse response, $R_p$ is the autocorrelation function of the pulse shape filter, and $T_c$ is the chip duration. In Equation (1), both $R(g)$ and $R_1$ may be governed by the orthogonal nature of the received signal. As such, to estimate the interference covariance matrix of the received signal, only two parameters, $E_c$ and $N_0$ may need to be estimated. $E_c$ and $N_0$ may be estimated based on the embedded pilot symbols, a common pilot channel and an assumed overhead percentage.

Platform noises, which may be Non-AWGN based, however, may not be modeled based on orthogonal nature or Gaussian distribution of the received signal. As such, when platform noise is present, the above parametric scheme may produce an inaccurate estimation. In the following sections of this disclosure, an estimation scheme that encompasses all types of impairments, including interference and platform noises will be introduced.

FIG. 1 illustrates an example wireless communication system in accordance with various embodiments. A wireless communication system 100 may include one or more wireless communication networks, generally shown as 110, 120, and 130. In particular, the wireless communication system 100 may include a wireless personal area network (WPAN) 110, a wireless local area network (WLAN) 120, and a wireless metropolitan area network (WMAN) 130. Although FIG. 1 depicts three wireless communication networks, the wireless communication system 100 may include additional or fewer wireless communication networks. For example, the wireless communication networks 100 may include additional WPANs, WLANs, and/or WMANs. The methods and apparatus described herein are not limited in this regard.

The wireless communication system 100 may also include one or more subscriber stations, generally shown as 140, 142, 144, 146, and 148. For example, the subscriber stations 140, 142, 144, 146, and 148 may include wireless electronic devices such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), a set-top box, and/or other suitable relatively stationary, portable, or mobile electronic devices. Although FIG. 1 depicts five subscriber stations, the wireless communication system 100 may include more or less subscriber stations.

The subscriber stations 140, 142, 144, 146, and 148 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, multi-carrier modulation (MDM), orthogonal frequency division multiple access (OFDMA), and/or other suitable modulation techniques to communicate via wireless links. In one example, the laptop computer 140 may operate in accordance with suitable wireless communication protocols that require very low power such as Bluetooth®, ultra-wide band (UWB), and/or radio frequency identification (RFID) to implement the WPAN 110. In particular, the laptop computer 140 may communicate with devices associated with the WPAN 110 such as the video camera 142 and/or the printer 144 via wireless links.

In another example, the laptop computer 140 may use direct sequence spread spectrum (DSSS) modulation and/or frequency hopping spread spectrum (FHSS) modulation to implement the WLAN 120 (e.g., the 802.11 family of standards developed by the Institute of Electrical and Electronic Engineers (IEEE) and/or variations and evolutions of these standards). For example, the laptop computer 140 may communicate with devices associated with the WLAN 120 such as the printer 144, the handheld computer 146 and/or the smart phone 148 via wireless links. The laptop computer 140 may also communicate with an access point (AP) 150 via a wireless link. The AP 150 may be operatively coupled to a router 152 as described in further detail below. Alternatively, the AP 150 and the router 152 may be integrated into a single device (e.g., a wireless router).

The laptop computer 140 may use OFDM modulation to transmit large amounts of digital data by splitting a radio frequency signal into multiple small sub-signals, which in turn, are transmitted simultaneously at different frequencies. In particular, the laptop computer 140 may use OFDM modulation to implement the WMAN 130. For example, the laptop computer 140 may operate in accordance with the 802.16 family of standards developed by IEEE to provide for fixed, portable, and/or mobile broadband wireless access (BWA) networks (e.g., the IEEE std. 802.16-2004, the IEEE std. 802.16e, etc.) to communicate with base stations, generally shown as 160, 162, and 164, via wireless link(s).

Although some of the above examples are described above with respect to standards developed by IEEE, the methods and apparatus disclosed herein are readily applicable to many specifications and/or standards developed by other special interest groups and/or standard development organizations (e.g., Wireless Fidelity (Wi-Fi) Alliance, WiMAX Forum, Infrared Data Association (IrDA), Third Generation Partnership Project (3GPP), etc.). The methods and apparatus described herein are not limited in this regard.

The WLAN 120 and WMAN 130 may be operatively coupled to a common public or private network 170 such as the Internet, a telephone network (e.g., public switched telephone network (PSTN)), a local area network (LAN), a cable network, and/or another wireless network via connection to an Ethernet, a digital subscriber line (DSL), a telephone line, a coaxial cable, and/or any wireless connection, etc. In one example, the WLAN 120 may be operatively coupled to the common public or private network 170 via the AP 150 and/or the router 152. In another example, the WMAN 130 may be operatively coupled to the common public or private network 170 via the base station(s) 160, 162, and/or 164.

The wireless communication system 100 may include other suitable wireless communication networks. For example, the wireless communication system 100 may include a wireless wide area network (WWAN) (not shown). The laptop computer 140 may operate in accordance with other wireless communication protocols to support a WWAN. In particular, these wireless communication protocols may be based on analog, digital, and/or dual-mode communication system technologies such as Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, High Speed Packet Access (HSPA) technology, Long Term Evolution (LTE) technology, standards based on these technologies, variations and evolutions of these standards, and/or other suitable wireless communication standards. Further, the wireless communication system 100 may include a wireless mesh network. Although FIG. 1 depicts a WPAN, a WLAN, and a WMAN, the wireless communication system 100 may include other combinations of WPANs, WLANs, WMANs, WWANs, and/or mesh networks. The methods and apparatus described herein are not limited in this regard.

The wireless communication system 100 may include other WPAN, WLAN, WMAN, and/or WWAN devices (not shown) such as network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system. Although certain examples have been described above, the scope of coverage of this disclosure is not limited thereto.

Figure 2:
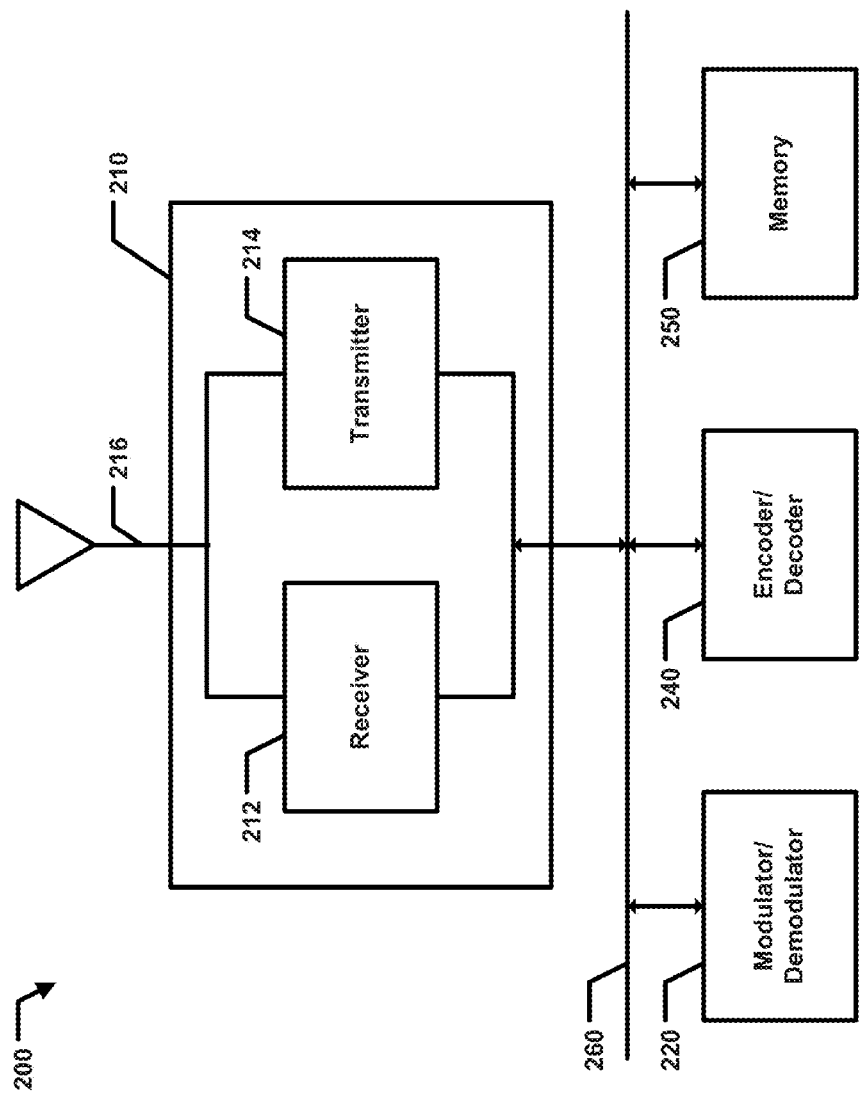
FIG. 2 is a block diagram illustrating an example embodiment of a station 200 in accordance with various embodiments.

FIG. 2 is a block diagram illustrating an example embodiment of a station 200 in accordance with various embodiments. In various embodiments, the station 200 may be the subscriber station 148 or the base station 160 illustrated in FIG. 1. The station 200 may include a communication interface 210, a modulator/demodulator 220, a mapper/demapper 240, and a memory 250. Although FIG. 2 depicts components of the station 200 coupling to each other via a bus 260, these components may be operatively coupled to each other via other suitable direct or indirect connections (e.g., a point-to-point connection or a point-to-multiple point connection).

Briefly, in various embodiments, the communication interface 210 (e.g., a radio-frequency (RF) physical-layer (PHY) sub-system) may include a receiver 212, a transmitter 214, and an antenna 216. The communication interface 210 may receive and/or transmit data via the receiver 212 and the transmitter 214, respectively. The antenna 216 may include one or more directional or omni-directional antennas such as dipole antennas, monopole antennas, patch antennas, loop antennas, microstrip antennas, and/or other types of antennas suitable for transmission of RF signals. Although FIG. 2 depicts a single antenna, the station 200 may include additional antennas. For example, the station 200 may include a plurality of antennas to implement a multiple-input-multiple-output (MIMO) system.

While FIG. 2 depicts particular components, the station 200 may include other suitable components to operate within a wireless communication network. Further, although the components shown in FIG. 2 are depicted as separate blocks within the station 200, the functions performed by some of these blocks may be integrated within a single semiconductor circuit or may be implemented using two or more separate integrated circuits. For example, although the receiver 212 and the transmitter 214 are depicted as separate blocks within the communication interface 210, the receiver 212 may be integrated into the transmitter 214 (e.g., a transceiver). In another example, while the modulator/demodulator 220 are shown in a single block, they may be implemented as two separate components of the station 200 (e.g., a modulator and a demodulator).

Figure 3:
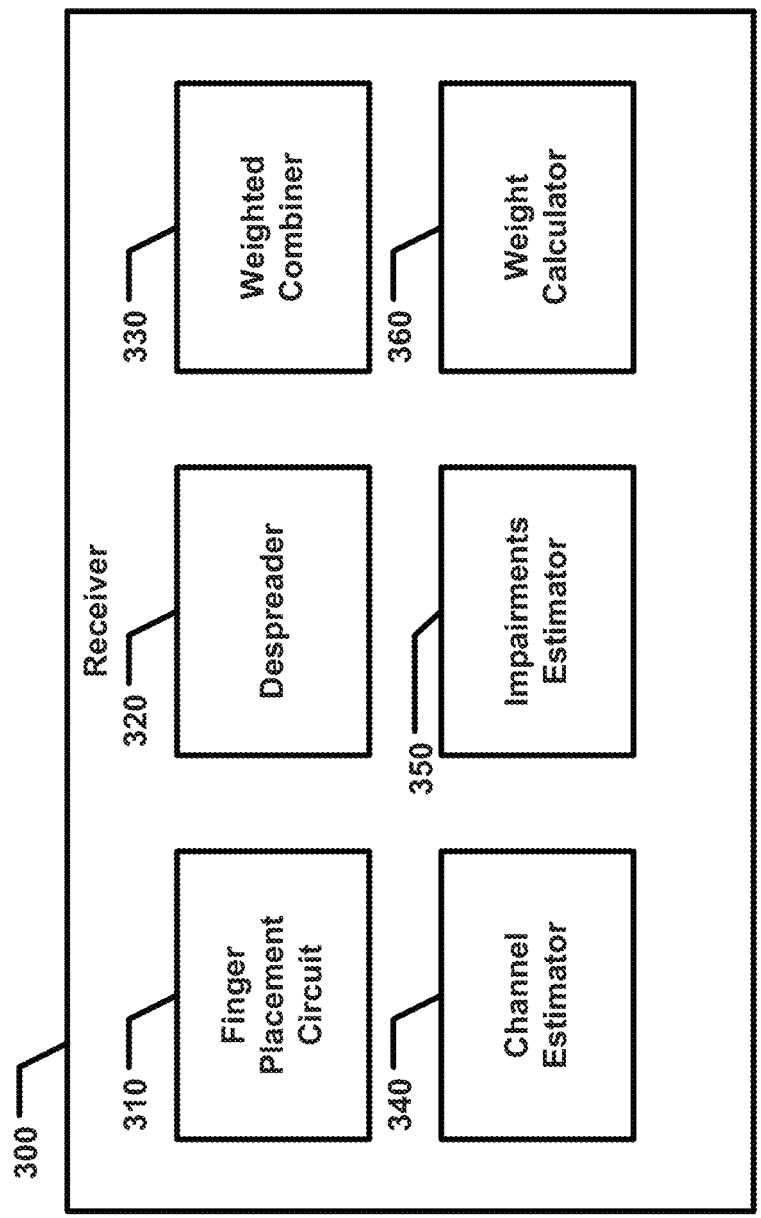
FIG. 3 is a block diagram illustrating a receiver 300 adapted to estimate impairments caused by interference, AWGN and platform noise of the received signal, in accordance with various embodiments.

FIG. 3 is a block diagram illustrating a receiver 300 adapted to estimate impairments caused by interference and platform noises of the received signal, in accordance with various embodiments. In one example, the receiver 300 may be the receiver 212 illustrated in FIG. 2. The receiver 300 may include a finger placement circuit 310, a despreader 320, a combiner 330, a channel estimator 340, an impairments estimator 350, and a weight calculator 360. The finger placement circuit 310 may place each finger of the receiver 300 based on each channel of the received multipath wireless signal. The despreader 320 may despread the wireless signal that is spread during transmission. The combiner 330 may combine multiple channels of the signal as received from the multiple fingers. The channel estimator 340 may estimate the channel of the received signal. The impairments estimator 350 may estimate the impairments, including both noise and interference, of the received signal. The weight calculator 360 may be used to assign a weight to each signal before they are combined by the combiner 330.

While FIG. 3 depicts particular components, the receiver 300 may include other suitable components to operate within a wireless communication network. Further, although the components shown in FIG. 3 are depicted as separate blocks within the receiver 300, the functions performed by some of these blocks may be integrated within a single semiconductor circuit or may be further sub-divided into multiple components.

In various embodiments, the impairments estimator 350 may be configured to estimate impairments caused by both noise and interference. Equation (3) may represent the parametric relationship between the estimated impairments and the received signal, $$R_u = \frac{1}{N_s - 1} \sum_{m=0}^{N_s-1} (y(m) - hs(m))(y(m) - hs(m))', \quad (3)$$

wherein $R_u$ is the estimated impairments covariance matrix, m is the symbol index, y(m) is the received signal, h is the estimated channel, s(m) is the pilot symbol and $N_s$ is the number of pilot symbols over one time slot. Based on Equation (3), the impairments estimator 350 may estimate impairments that encompass both platform noise and interference of the wireless signals. The impairments estimator 350 may estimate the impairments by estimating each and every entry of the impairment covariance matrix $R_u$. In one example, for a 6-tap receiver with diversity, the impairment estimation may be performed by estimating every element in the 12×12 covariance matrix.

In various embodiments, an average filter, such as an infinite impulse response (IIR) filter, may be applied to smooth the estimation of $R_u$ over multiple time slots.

Figure 4:
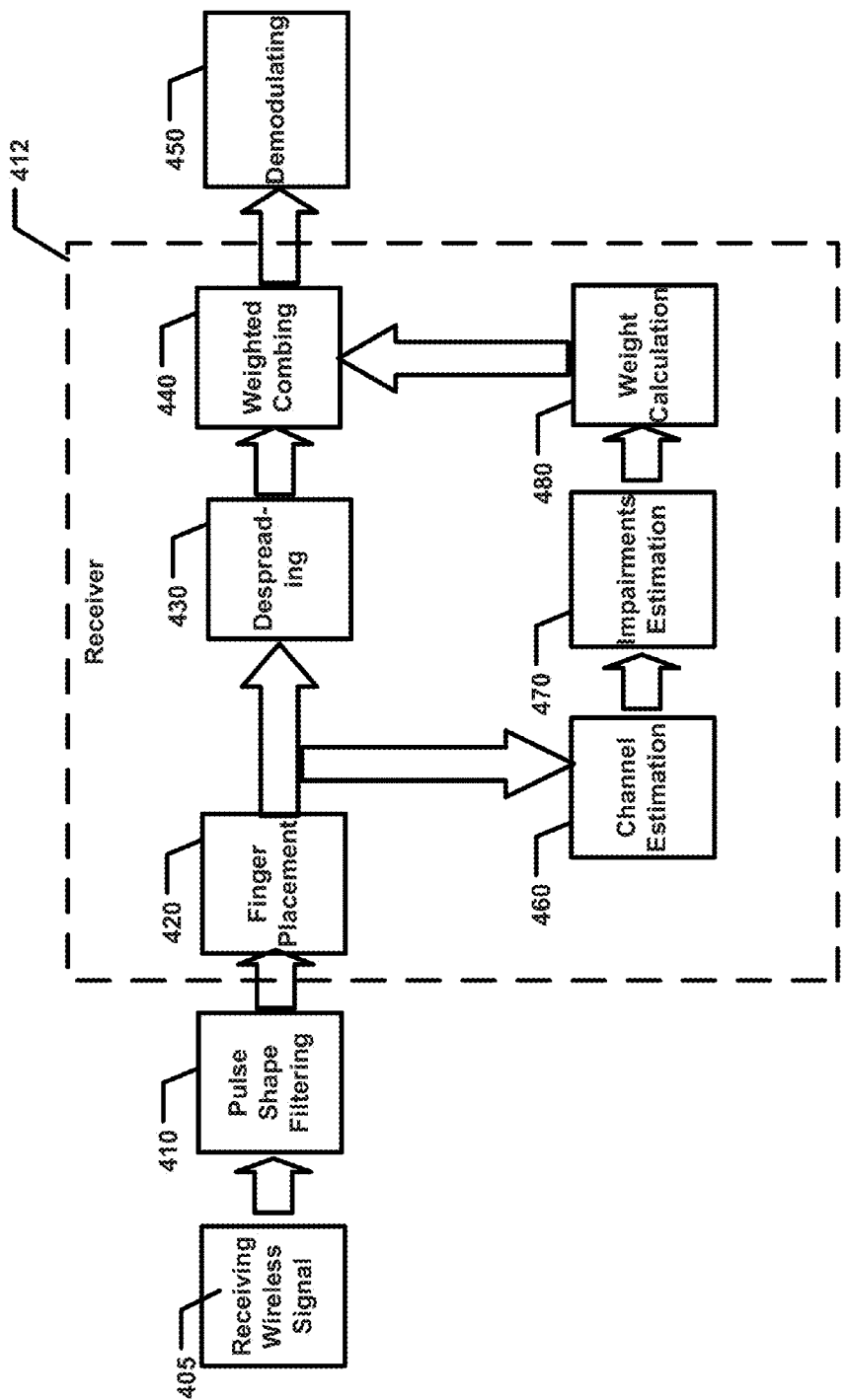
FIG. 4 is a block diagram illustrating a portion of an example operation of the receiver 300 in accordance with various embodiments.

FIG. 4 is a block diagram illustrating a portion of an example operation of the receiver 300 in accordance with various embodiments. The wireless signal may be received in block 405. The received wireless signal may be filtered by a pulse shape filter in block 410. Each channel of the filtered signal may be placed with a finger of the receiver in block 420. The channelized signal may go through despreading in block 430 for additional processing. In addition, the channelized signal may further undergo channel estimation in block 460, impairments estimation in block 470, and weight calculation in block 480. The despreaded data of all the channels may be combined based on the weight calculation in block 440. The combined data may be demodulated in block 450.

While FIG. 4 depicts several operations, the receiver 300 or a station that contains the receiver 300 may employ other suitable operations in order to fully process the received wireless signal. For example, after the demodulation in bock 450, the received wireless signal may further undergo stages of demapping, de-interleaving, physical channel concatenating, encoded block segmenting, channel decoding, code block concatenating, and/or cyclic redundancy calculation (CRC) unpadding, etc.

In various embodiments, estimating every element of the impairments covariance matrix may lead to slightly larger estimation error due to the number of parameters that needs to be estimated. To compensate the estimation error when platform noise is not significant in the wireless signal, an adaptive switch scheme between estimation based on interference and AWGN and the estimation based on impairments including both platform noise and interference may be adopted. In some embodiments, estimation based on interference may be based solely on interference.

Figure 5:
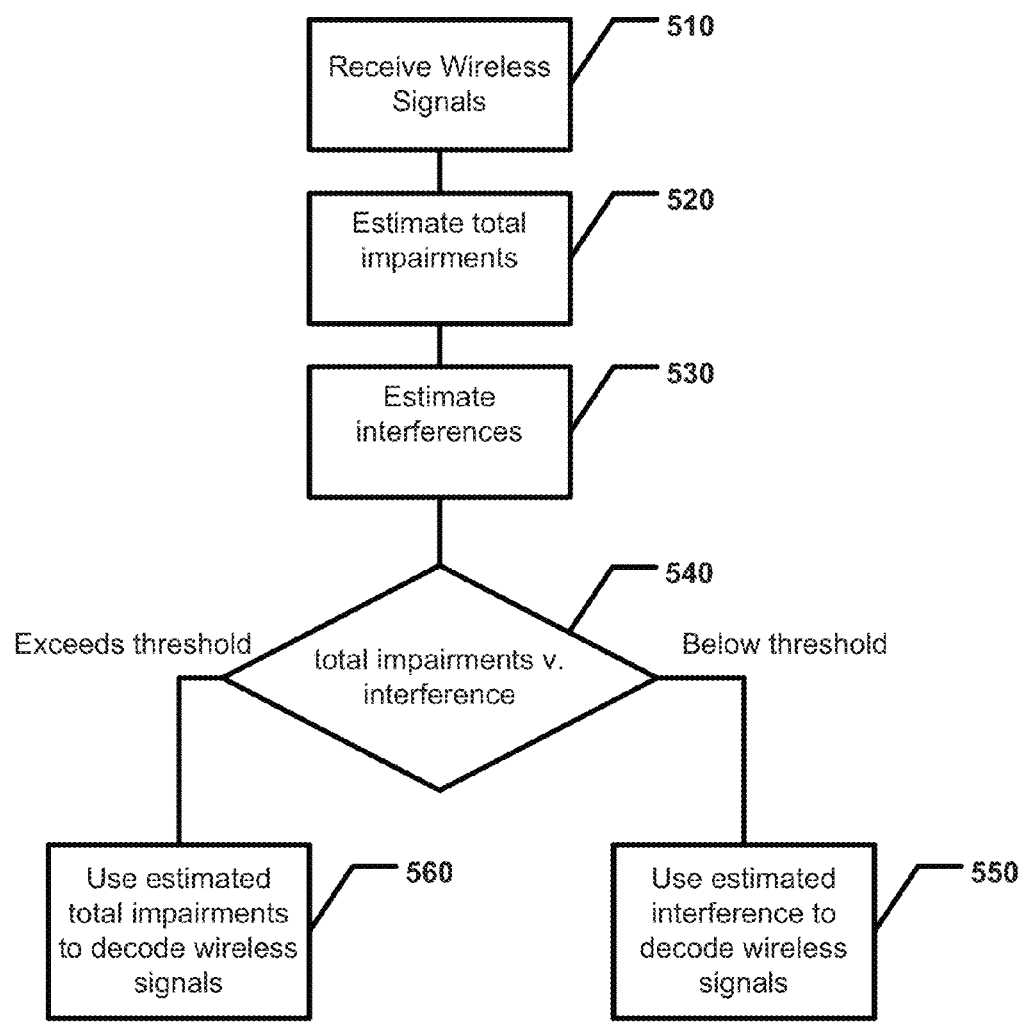
FIG. 5 is a flow diagram illustrating a portion of an example adaptive switch scheme of the receiver 300 in accordance with various embodiments.

FIG. 5 is a flow diagram illustrating a portion of an example adaptive switch scheme of the receiver 300 in accordance with various embodiments. In various embodiments, the receiver 300 may receive the wireless signal in block 510. The receiver 300 may estimate the spatial correlation and temporal correlation of the covariance matrix of the impairments encompassing both platform noises and interference in block 520. The receiver 300 may estimate the spatial correlation and temporal correlation of the impairments based on interference and AWGN in block 530. The receiver 300 may compare the two estimation results to determine whether a threshold has been reached in block 540. The level of the threshold may be set and/or adjusted based on particular situation of a particular station. In various embodiments, if the difference between the spatial correlation of the impairments estimation encompassing the platform noises v. spatial correlation of the impairments estimation based on interference and AWGN is bigger than or about 10%, and the difference between the temporal correlation of the impairments estimation including the platform noises and interference and the temporal correlation of the impairments estimation based on interference and AWGN is also bigger than or about 10%, then the receiver 300 may choose the impairments estimation based on the combined platform noises and interference in block 550, otherwise, the receiver 300 may choose the estimation based on interference and AWGN in block 560.

Figure 6:
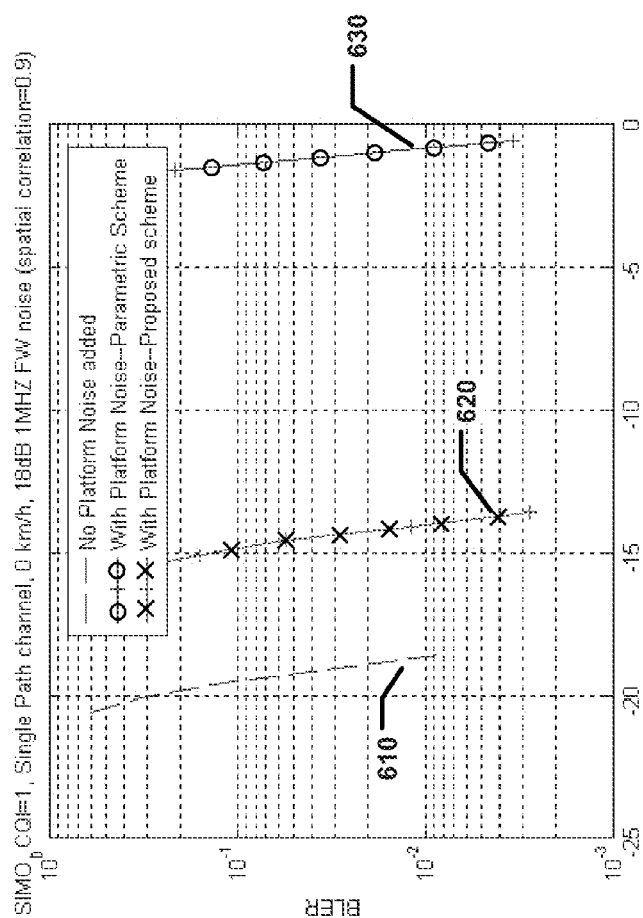
FIG. 6 illustrates simulation results of a block error rate (BLER) performance of a receiver in accordance with various embodiments.

FIG. 6 illustrates simulation results of a block error rate (BLER) performance of a receiver in accordance with various embodiments. In FIG. 6, the X-axis may represent the transmit power from the desired base station over AWGN, and the Y-axis may represent BLER. In simulations, an 18 decibel (dB) 1 megahertz (MHz) synthesized (FW) platform noises with 0.9 spatial correlation are introduced. The receiver performance without added platform noises is labeled as 610. When the platform noises are introduced, the receiver performance based on estimating interference and AWGN only is labeled as 630, and the receiver performance based on estimating platform noises and interference is labeled as 620. As illustrated, the estimation scheme based on interference and AWGN only may degrade the receiver performance by 18 dB, and the estimation scheme based on impairments encompassing platform noise and interference may increase the receiver performance by 13 dB.

Figures 7A, 7B:
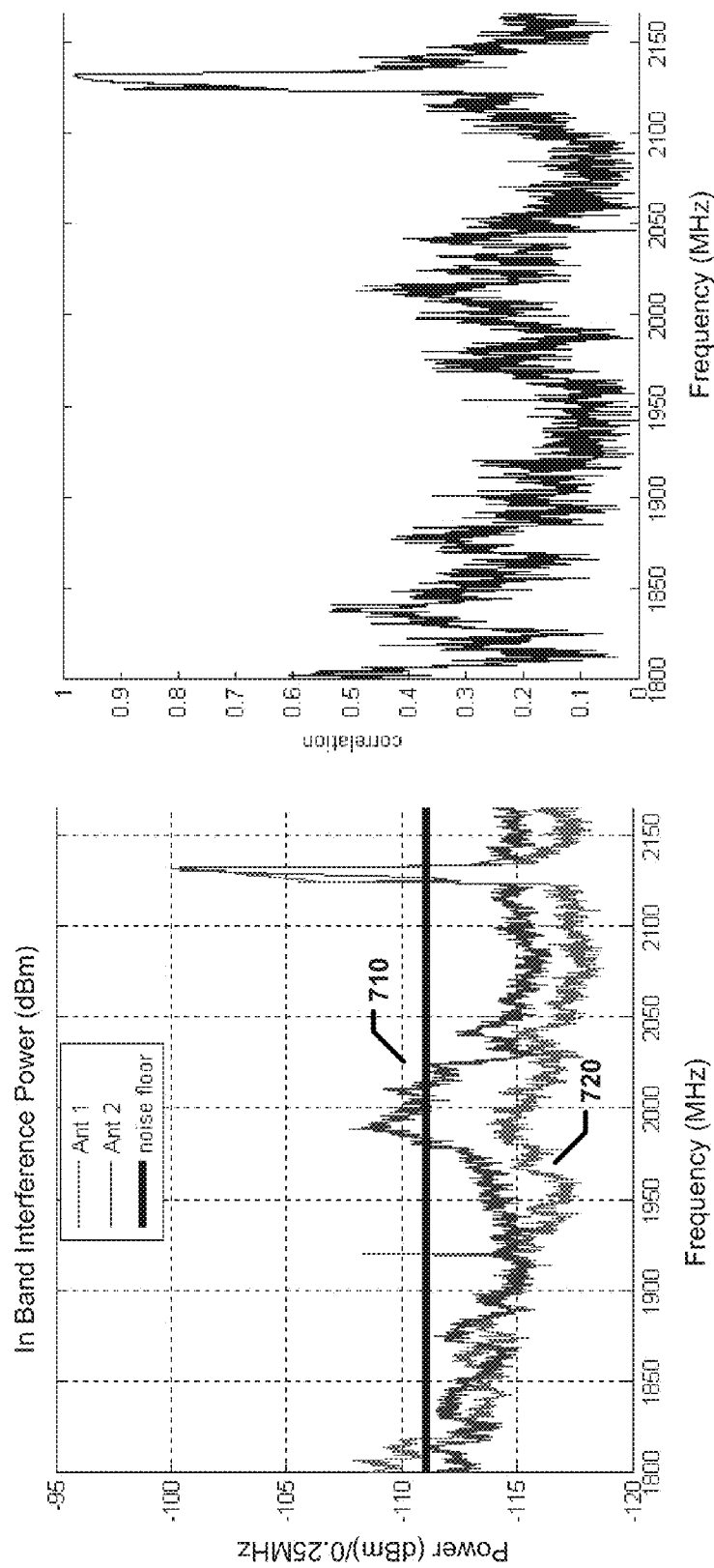
FIG. 7(a) illustrates a platform noise power spectrum of two antennas from one notebook computer in accordance with various embodiments.
FIG. 7(b) illustrates a spatial correlation of two antennas in accordance with various embodiments.

FIG. 7(*a*) illustrates a platform noises power spectrum of two antennas from one notebook computer in accordance with various embodiments, respectively labeled as 710 and 720. FIG. 7(*b*) illustrates a spatial correlation between the two antennas of the notebook computer as illustrated in FIG. 7(*a*) in accordance with various embodiments. As illustrated, the platform noises of the notebook computer may be around 2130 MHz with a level of 13 dB higher than system noise floor.

Figure 8:
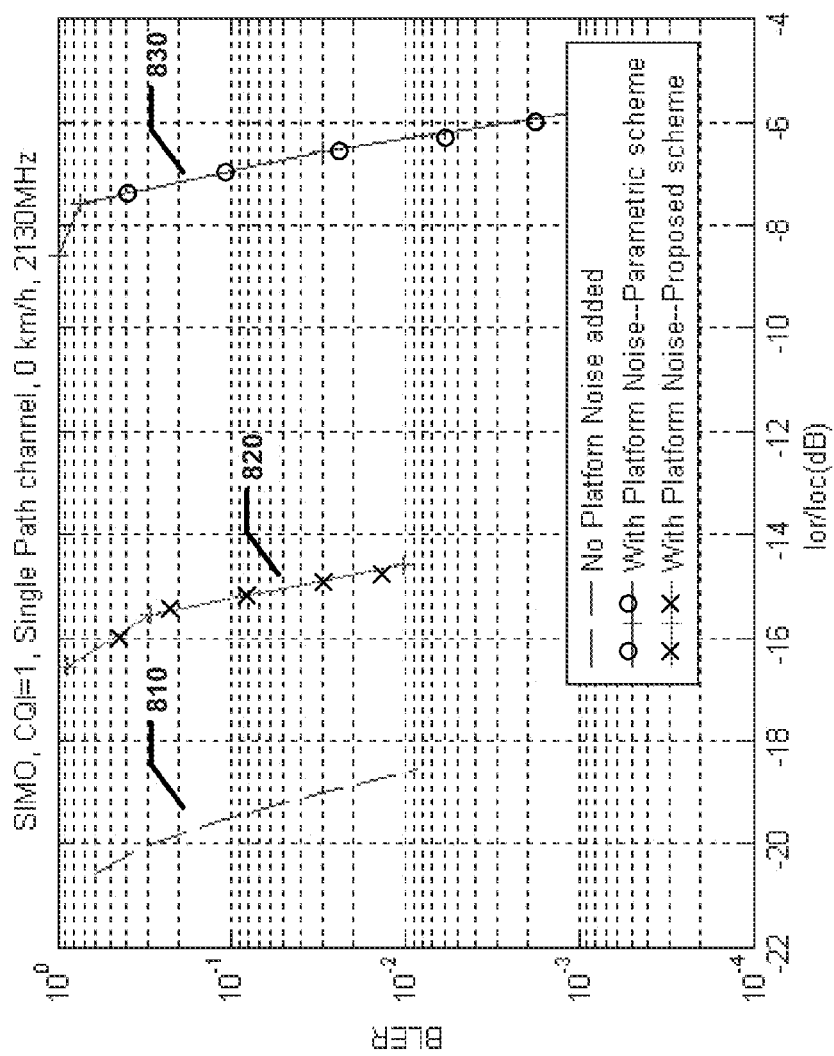
FIG. 8 illustrates simulation results of the BLER performance with platform noise based on the notebook computer illustrated in FIG. 7, in accordance with various embodiments.

FIG. 8 illustrates simulation results of the BLER performance with platform noise based on the notebook computer illustrated in FIG. 7, in accordance with various embodiments. In simulations, a 13 dB platform noise at 2130 MHz is injected. The receiver performance without added platform noises is labeled as 810. When the platform noises are introduced, the receiver performance based on estimating interference and AWGN only is labeled as 830, and the receiver performance based on estimating both the platform noises and interference is labeled as 820. In various embodiments, the estimation scheme based on interference and only AWGN may degrade the receiver performance by 13 dB, and the estimation scheme based on impairments encompassing both platform noises and interference may increase the receiver performance by 8 dB. As illustrated, in various embodiments, the estimation scheme based on impairments encompassing both platform noises and interference may not impose any model on either the noise or interference, therefore, may be used to estimate any type of noise or interference. As a result, both the spatial and temporal correlated noise and interference may be mitigated.

Figure 9:
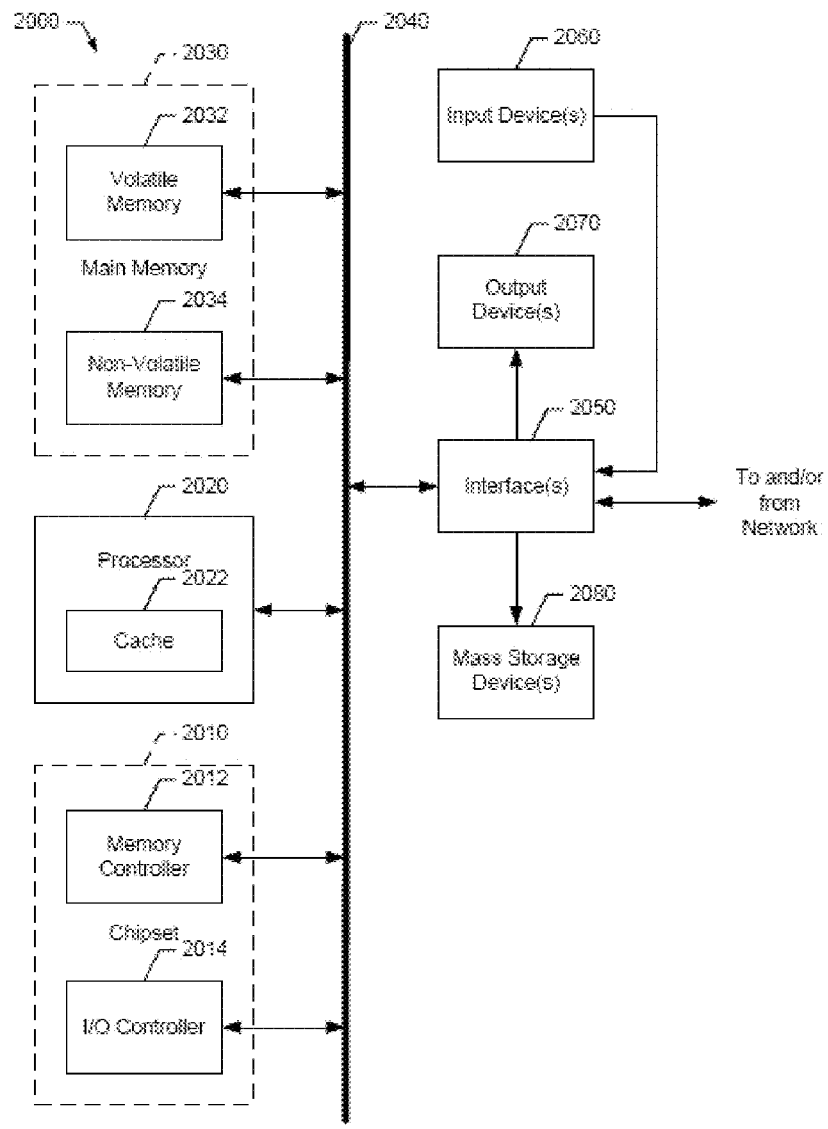
FIG. 9 is a block diagram of an example processor system 2000 adapted to implement the methods and apparatus disclosed herein.

FIG. 9 is a block diagram of an example processor system 2000 adapted to implement the methods and apparatus disclosed herein. The processor system 2000 may be a desktop computer, a laptop computer, a handheld computer, a tablet computer, a PDA, a server, an Internet appliance, and/or any other type of computing device.

The processor system 2000 illustrated in FIG. 9 may include a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The processor 2020 may be implemented using one or more processors, WPAN components, WLAN components, WMAN components, WWAN components, and/or other suitable processing components. For example, the processor 2020 may be implemented using one or more of the Intel® Core™ technology, Intel® Pentium® technology, the Intel® Itanium® technology, the Intel® Centrino™ technology, the Intel® Xeon™ technology, and/or the Intel® XScale® technology. In the alternative, other processing technology may be used to implement the processor 2020. The processor 2020 may include a cache 2022, which may be implemented using a first-level unified cache (L1), a second-level unified cache (L2), a third-level unified cache (L2), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device.

The processor system 2000 may also include an interface circuit 2050 that is coupled to the bus 2040. The interface circuit 2050 may be implemented using any type of interface standard such as an Ethernet interface, a universal serial bus (USB), a third generation input/output (2GIO) interface, and/or any other suitable type of interface.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives.

The interface circuit 2050 may also include one or more communication devices such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc. In various embodiments, the communication link may be a wireless connection based on wireless networks as previously illustrated in FIG. 1. The network interface card may couple with, or include, a radio receiver as disclosed above and illustrated in FIG. 3.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 9 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present invention. This application is intended to cover any adaptations or variations of the embodiments discussed herein. Therefore, it is manifestly intended that the embodiments of the present invention be limited only by the claims and the equivalents thereof.

What is claimed is:

1. An apparatus comprising:
a multipath antenna configured to receive wireless signals;
an estimator coupled to the multipath antenna and configured to:
  perform a first estimation of impairments of the wireless signals indicative of interference and additive white Gaussian noise (AWGN) of the wireless signals,
  perform a second estimation of the impairments of the wireless signals indicative of the interference and platform noise of the wireless signals, and
determine whether a difference between the first estimation and the second estimation is more than a predetermined threshold; and
  a decoder configured to decode the wireless signals based on a result of said determination.

2. The apparatus of claim 1, wherein the estimator is further configured to perform the second estimation based on temporal and spatial correlation of the impairments of the wireless signals.

3. The apparatus of claim 1, wherein the estimator is further configured to perform the first estimation based on temporal correlation and spatial correlation of the impairments of the wireless signals.

4. The apparatus of claim 1, wherein the estimator is configured to perform the second estimation based on a received pilot symbol, an estimated channel, a transmitted pilot symbol, and a number of pilot symbols over one time slot.

5. The apparatus of claim 1, wherein the estimator is configured to perform the first estimation based on an estimation of a transmit power of a base station and a power of the AGWN of the wireless signals.

6. The apparatus of claim 5, wherein the decoder is further configured to decode the wireless signals based on the first estimation in response to a determination that the difference between the first estimation and the second estimation is smaller than the pre-defined threshold; or decode the wireless signals based on the second estimation in response to a determination that the difference between the first estimation and the second estimation is no smaller than the pre-defined threshold.

7. The apparatus of claim 1, wherein the predetermined threshold is about 10%.

8. The apparatus of claim 1, further comprising a combiner to combine the wireless signals.

9. A method, comprising:
 receiving wireless signals;
 performing a first estimation of impairments of the wireless signals indicative of interference and additive white Gaussian noise (AWGN) of the wireless signals;
 performing a second estimation of the impairments of the wireless signals indicative of the interference and platform noise of the wireless signals;
 comparing the first estimation to the second estimation; and
 mitigating an effect of the impairments of the wireless signals based on said comparing.

10. The method of claim 9, wherein determining the first estimation further includes estimating the interference of the wireless signals caused by intra-cell interference, inter-cell interference and inter-symbol interference of the wireless signals.

11. The method of claim 9, wherein determining the second estimation further includes estimating a combined noise and interference covariance matrix based on received pilot symbols, estimated channel of respective ones of the received pilot symbols, transmitted pilot symbols, and number of pilot symbols over one time slot.

12. The method of claim 9, further comprising averaging, by the station, a plurality of second estimations corresponding to a plurality of time slots, respectively, based on an infinite impulse response filter.

13. The method of claim 9, wherein said comparing comprises determining whether a difference between the first estimation and the second estimation is more than a predetermined threshold and the method further comprises:
 decoding, by the station, the wireless signals based on the first estimation in response to a determination that the difference is within the pre-defined threshold.

14. The method of claim 9, wherein said comparing comprises determining whether a difference between the first estimation and the second estimation is more than a predetermined threshold and the method further comprises:
 decoding, by the station, the wireless signals based on the second estimation in response to a determination that the difference exceeds the pre-defined threshold.

15. The method of claim 9, wherein said comparing comprises determining whether a difference between the first estimation and the second estimation is more than about 10%.

16. A system comprising:
 one or more antenna units to receive wireless signals;
 a data bus coupled to the one or more antenna units;
 a receiver operatively coupled to the data bus and the one or more antenna units to:
  perform a first estimation of impairments of the wireless signals indicative of interference and additive white Gaussian noise (AWGN) of the wireless signals,
  perform a second estimation of the impairments of the wireless signals indicative of the interference and platform noise of the wireless signals, wherein the platform noise includes noise caused by the data bus of the system,
  compare a temporal correlation and a spatial correlation of the first estimation and the second estimation, and
  determine whether a first difference between the temporal correlation of the first estimation and the second estimation, and a second difference between the spatial correlation of the first estimation and the second estimation are both more than a predetermined threshold; and
 a decoder to decode the wireless signals based on said determination.

17. The system of claim 16, wherein the predetermined threshold is about 10%.

18. The system of claim 16, wherein to perform the second estimation further includes to estimate the impairments of the wireless signals based on received pilot symbol, estimated channel, transmitted pilot symbol, and number of pilot symbols in one time slot.

19. The system of claim 16, wherein the receiver is further configured to average a plurality of second estimations corresponding to a plurality of time slots, respectively, based on an infinite impulse response filter.

20. The system of claim 16, wherein the decoder to decode the wireless signals further includes the decoder to decode the wireless signals based on the second estimation in response to a determination that the first difference and the second difference are both more than the predetermined threshold.

* * * * *